(12) United States Patent  
Yuan et al.

(10) Patent No.: US 9,422,764 B2  
(45) Date of Patent: Aug. 23, 2016

(54) THREE-DOOR STRUCTURE SUITABLE FOR TWO-AXIS ROTATION TYPE COATING MIXER

(75) Inventors: Fuming Yuan, Zhengzhou (CN); Yaobin Xue, Zhengzhou (CN)

(73) Assignee: Ruhua Shen, Henan (CN)

( * ) Notice: Subject to any disclaimer, the term of this patent is extended or adjusted under 35 U.S.C. 154(b) by 575 days.

(21) Appl. No.: 13/878,348

(22) PCT Filed: Dec. 12, 2011

(86) PCT No.: PCT/CN2011/083833  
§ 371 (c)(1),  
(2), (4) Date: Apr. 8, 2013

(87) PCT Pub. No.: WO2012/079494  
PCT Pub. Date: Jun. 21, 2012

(65) Prior Publication Data  
US 2013/0265844 A1    Oct. 10, 2013

(30) Foreign Application Priority Data  
Dec. 13, 2010   (CN) .................... 2010 2 0655877 U (51) Int. Cl.  
*B01F 15/00*   (2006.01)  
*E06B 3/50*   (2006.01)  
(Continued)

(52) U.S. Cl.  
CPC ......... *E06B 3/5081* (2013.01); *B01F 15/00753* (2013.01); *B01F 15/00779* (2013.01); *F16P 1/00* (2013.01); *F16P 3/08* (2013.01)

(58) Field of Classification Search  
CPC .................. B01F 15/00753; B01F 15/00779; B01F 15/00785; F16P 3/08; F16P 1/00; E06B 3/5081  
See application file for complete search history.

(56) References Cited

U.S. PATENT DOCUMENTS 4,037,827 A    7/1977  Davison  
5,711,601 A *  1/1998  Thomas ............ B01F 15/00753  
366/209

(Continued)

FOREIGN PATENT DOCUMENTS

CN    201119399 Y    9/2008  
CN    201912909 U    8/2011  
(Continued)

OTHER PUBLICATIONS

International Search Report for International application No. PCT/CN2011/083833, Feb. 6, 2012, with English translation.

(Continued)

*Primary Examiner* — Charles Cooley  
(74) *Attorney, Agent, or Firm* — Cantor Colburn LLP (57) ABSTRACT

A three-door structure suitable for rotation type coating mixer may include an upper lid cover, symmetrically arranged front doors, a door movement support frame, and linear straight guide rails. The upper lid cover may be located at the top of the machine casing and fixedly arranged on the door movement support frame. The front doors may be symmetrically arranged on the front side of the machine casing. The linear straight guide rails may be installed on the housing of the machine casing through a guide rail fixing base. The door movement support frame may be symmetrically connected on two sides to sliding blocks arranged on the guide rails. The front doors may be connected to two sides of the door movement support frame. The lower ends front doors may be engaged with a fixing base at the bottom of the machine casing through a joining part.

8 Claims, 11 Drawing Sheets

(51) Int. Cl.
*F16P 3/08* (2006.01)
*F16P 1/00* (2006.01)

(56) References Cited

U.S. PATENT DOCUMENTS

| | | | |
|---|---|---|---|
| 6,850,020 B1 * | 2/2005 | Midas | B01F 11/0008 |
| | | | 318/286 |
| 8,157,436 B2 * | 4/2012 | Curtis | B01F 9/0001 |
| | | | 366/197 |
| 2009/0207690 A1 | 8/2009 | Curtis | |
| 2013/0265844 A1 * | 10/2013 | Yuan | B01F 15/00753 |
| | | | 366/110 |

FOREIGN PATENT DOCUMENTS

| | | | | |
|---|---|---|---|---|
| CN | 201978695 U | | 9/2011 | |
| DE | 19611546 C1 | * | 8/1997 | ............ B01F 9/0001 |
| DE | 10020804 A1 | * | 11/2001 | ......... B23Q 11/0833 |
| DE | 10023073 A1 | | 11/2001 | |
| EP | 1525914 A2 | | 4/2005 | |
| JP | 5-146319 A | | 6/1993 | |

OTHER PUBLICATIONS

Extended European Search Report for Application No. 11879054-1751/2610000, dated Feb. 6, 2014.

* cited by examiner

THREE-DOOR STRUCTURE SUITABLE FOR TWO-AXIS ROTATION TYPE COATING MIXER

CROSS REFERENCE TO RELATED APPLICATIONS

This is the U.S. national stage of application No. PCT/CN2011/083833, filed on 12 Dec. 2011. Priority under 35 U.S.C. §119(a) and 35 U.S.C. 365(b) is claimed from Chinese Application No. 201020655877.1, filed 13 Dec. 2010, the disclosure of which is also incorporated herein by reference.

FIELD OF THE INVENTION

The present application relates to a double gyroscopic mixer for coating, paint and the like and, particularly to, a tri-directional-sliding door structure for a double gyroscopic paint mixer.

BACKGROUND OF THE INVENTION

Presently, mixers in coating industry include vibrating mixers and rotating mixers (i.e., gyroscopic mixers). The present application relates to a gyroscopic mixer, and particularly to an automatic double gyroscopic mixer. A double gyroscopic mixer is an apparatus for blending or mixing coatings, paints and the like, which can allow a barrel containing coatings, paints and the like (hereinafter, being referred to therein as coating barrel for short) to rotate about a rotation axis perpendicular to a geometric center line of the coating barrel while rotating about the geometric center line of the coating barrel in the double gyroscopic mixer, i.e. performing a rotation and a revolution at the same time, so as to mix coatings by a double rotating. If it is required to mix coatings in the barrel or mix a color-matching paste added into the barrel with a white basic coating contained in the barrel to obtain a uniform color, firstly, the coating barrel is put into a double gyroscopic mixer between an upper clamping plate 4' and the lower clamping plate 6' and on the lower clamping plate, wherein the upper clamping plate 4' and the lower clamping plate 6' are located between an upper supporting arm 3' and a lower supporting arm 5' (referring to FIGS. 1, 2 and 3 which show automatic double gyroscopic mixers available in the present market). A number of such automatic double gyroscopic mixers each include a lower supporting arm consisting of two parts, one of which can be pulled out outwardly so as to pull the lower clamping plate out and then can be pushed inwardly after the coating barrel has been placed, thus reducing the difficulty in placing the coating barrel into the mixer.

Figure 1:
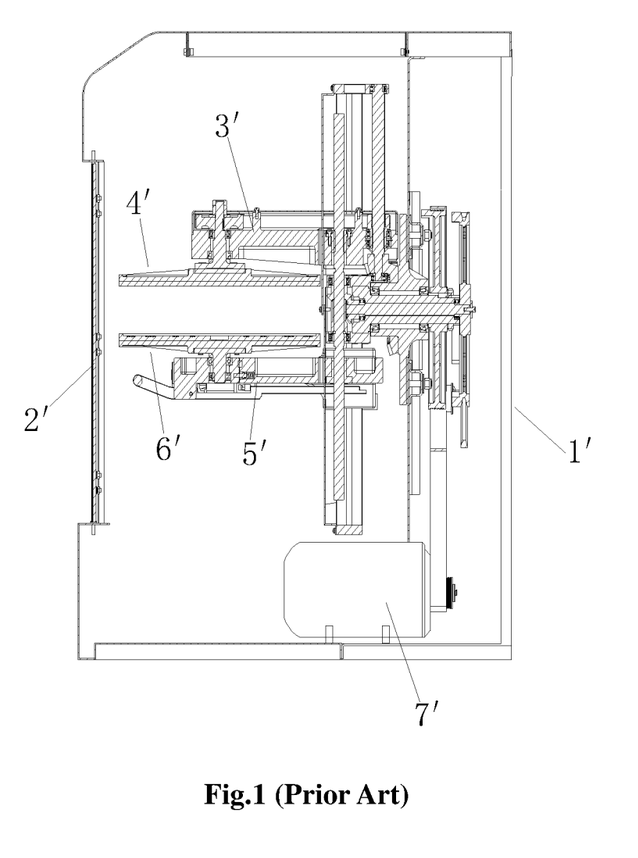
FIG. 1 is a structural schematic view of a double gyroscopic mixer of the prior art.
Figure 2:
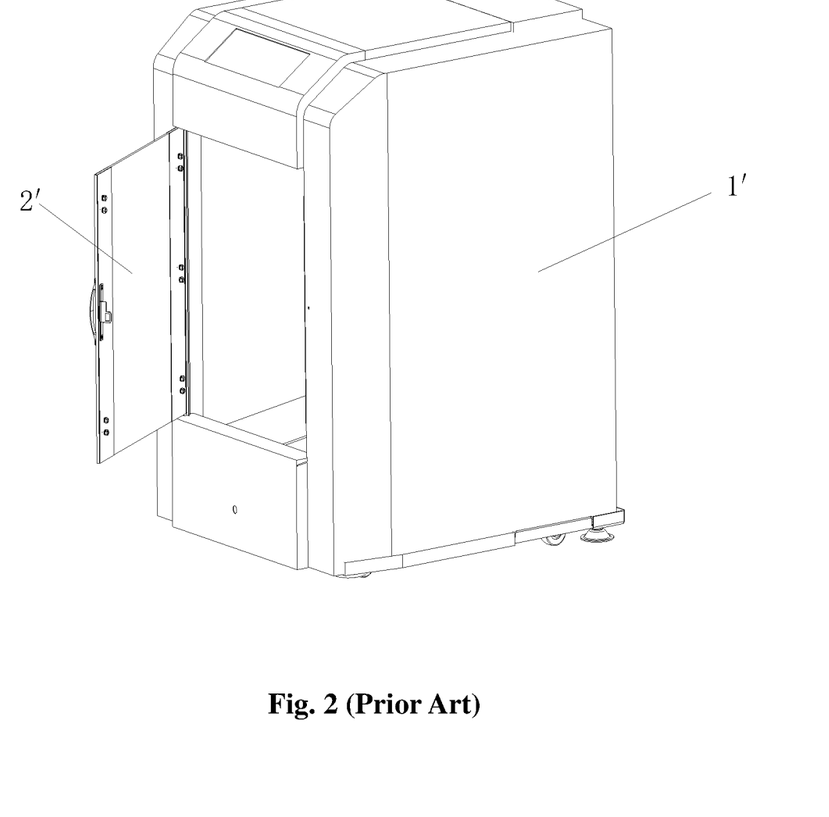
FIG. 2 is a schematic view of a rotation door structure of the prior art.

A door structure of such a double gyroscopic mixer available in present market mainly is a structure shown in FIGS. 1 and 2. A door 2' is of a plate-like structure, with one end being fixed on a rotating shaft, and the entire door structure can rotate about this rotating shaft to close or open the door. This door structure is in the most common form, but may arise a main problem that, after the door is opened, only a front space of the machine is opened, resulting in a relatively small opened space of the machine. Specifically, since the upper clamping plate and the lower clamping plate of the mixing structure of the double gyroscopic mixer and the coating barrel pressed are located within a cabinet shell 1' of the entire machine, when it is required to take the coating barrel out, an operator has to do this through the space opened by the door structure. However, the coating barrel is usually heavy, and thus it is difficulty taken out somewhat.

Figure 3:
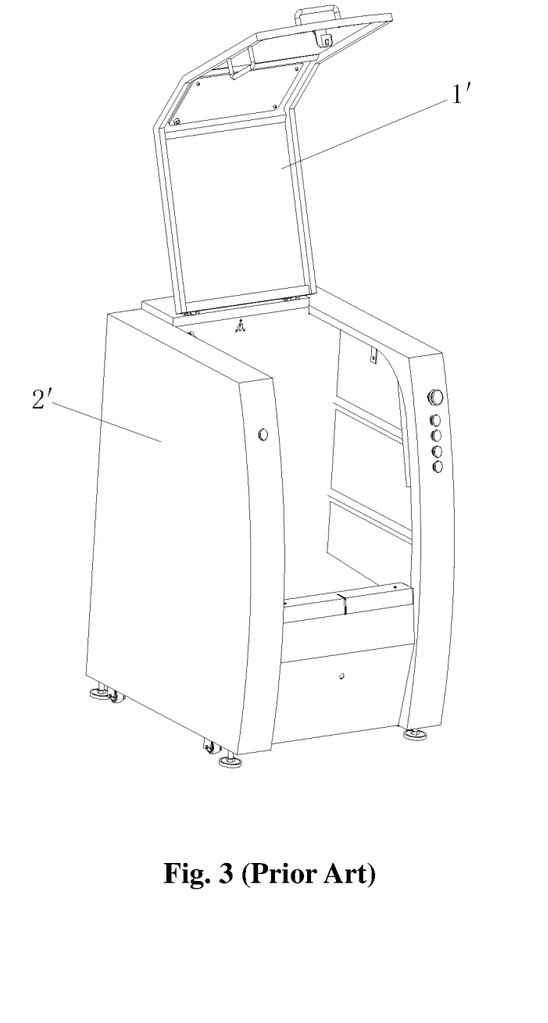
FIG. 3 is a schematic view of an L-shaped door structure of the prior art.

FIG. 3 shows another door structure of a gyroscopic mixer available in the present market. In this gyroscopic mixer, the entire door structure covers a front side and a top side of the machine cabinet shell 1', and a door hinge of the door is generally arranged at the rear of the top side of the machine, so that the entire door 2' is similar to "L" in structure and appearance. Since the space opened by this door structure is relatively large, that is, the front side and the top side of the cabinet shell can be opened, it is more convenient for users to put in or take out a color paint barrel. Also, for this door structure, when the door is opened, there is a need for more space above the machine. If the space above the cabinet shell is too narrow to allow the approximately L-shaped door to be rotatably opened, the door of this structure cannot be completely opened. When such a gyroscopic mixer is supplied to the market, some of paint mixing shops even cannot use the gyroscopic mixer having this door structure due to very compact space of the paint mixing shops.

Furthermore, a gyroscopic mixer having a rolling door structure is available in the present market. For the gyroscopic mixer having such a door structure, more space of the machine can be opened, and there is no requirement on the external space of the machine. Therefore, the gyroscopic mixer with the door structure is widely favorable in the market. However, such a door structure has problems in insufficient strength of the door and relatively large noise generated from a door curtain in the operation of the machine. Moreover, it is difficult to solve a problem that such a door structure cannot be pulled or pushed smoothly in use.

SUMMARY OF THE INVENTION

In view of the above limitations and shortcomings of the prior art, an object of the present application is to specially design a tri-directional-sliding door structure suitable for a gyroscopic paint mixer. A top cover, a left front door and a right front door of a machine designed according to the present application are connected through linear guiding rails and hinged mounting structures, and thus the interaction between the top cover and the left and right front doors of the machine can be carried out only by pushing the top cover on the machine shell, so as to open and close a top side and a front side of the machine shell; and opening and closing of the three directional doors, i.e. the top cover, and the left and right front doors, only take the inner space of the machine shell, thereby greatly lowering the requirement on external space of the machine and being convenient in use.

According to an aspect of the present application, a tri-directional-sliding door structure suitable for a double gyroscopic paint mixer is provided, which includes a top cover, left and right front doors symmetrically arranged, a door-moving bracket, and left and right linear guiding rails, wherein the top cover is located at the top of a cabinet and is fixedly mounted on the door-moving bracket, the left and right front doors are symmetrically arranged on a front side of the cabinet, the left and right linear guiding rails are mounted on a cabinet shell by guiding rail fixing holders respectively, left and right sides of the door-moving bracket are symmetrically connected to sliders arranged on and sliding along the linear guiding rails, the left and right front doors are symmetrically hinged to two sides of the door-moving bracket, and lower ends of the left and right front doors are both interacted with a fixing holder at the bottom of the cabinet via connecting parts.

In the present application, the lower ends of the front doors may be connected to the fixing holder at the bottom of the cabinet in two manners as follows: i) the lower ends of the left and right front doors are both hinged to the fixing holder at the bottom of the cabinet via connecting rods; ii) the lower ends of the left and right front doors are both interacted with an arc guiding groove arranged in the fixing holder via rotating wheels.

According to another aspect of the present application, a paint mixer is provided, including a cabinet shell; a left guiding rail fixedly arranged on a left side of the cabinet shell and a right guiding rail fixedly arranged on a right side of the cabinet shell; a left slider and a right slider capable of sliding on the left guiding rail and the right guiding rail respectively; a door-moving bracket connected with the left slider and the right slider; a top cover which is located at the top of the cabinet shell and fixedly mounted on the door-moving bracket; and a left front door and a right front door which are symmetrically arranged on a front side of the cabinet shell and are respectively hinged to a left end and a right end of the door-moving bracket, wherein lower ends of the left front door and the right front door are connected to a fixing holder at the bottom of the cabinet shell.

Preferably, the left guiding rail and the right guiding rail are linear guiding rails, respectively.

Preferably, the left guiding rail and the right guiding rail are fixedly mounted on the cabinet shell by guiding rail fixing holders, respectively.

Preferably, a left end of the left front door and a right end of the right front door are hinged to the door-moving bracket via rotating shafts, respectively.

Preferably, the lower end of the left front door and the lower end of the right front door are hinged to the fixing holder at the bottom of the cabinet shell via connecting rods, respectively.

Preferably, the lower end of the left front door and the lower end of the right front door are interacted with a guiding groove arranged in the fixing holder via rotating wheels, respectively.

Preferably, the paint mixer is one of a gyroscopic paint mixer, a double gyroscopic paint mixer and a vibrating mixer.

The operating principle and process of the present application will be described below.

The top cover on the cabinet has a left end connected to the left slider and a right end connected to the right slider. The left and right linear guiding rails are symmetrically fixed on the cabinet shell. The left and right sliders are symmetrically fixed on the door-moving bracket. The left end of the left front door is coupled to the left end of the door-moving bracket via a door rotating shaft in hinged way; the right end of the right front door is coupled to the right end of the door-moving bracket via another door rotating shaft in hinged way; and the lower end of the left front door and the lower end of the right front door are coupled symmetrically via connecting rods and the rotating shaft to the fixing holder fixed at the bottom of the cabinet in hinged way, respectively.

When it is required to open the thi-directional doors of the cabinet, the top cover of the cabinet is pushed, and the door-moving bracket coupled with the top cover drives the left and right sliders to slide inwardly on the left and right linear guiding rails respectively. The left front end of the door-moving bracket hingedly drives the left front door to move inwardly, and the right front end of the door-moving bracket hingedly drives the right front door to move inwardly. Also, the lower end of the left front door is rotated about a hinged bearing by the left door connecting rod, and the lower end of the right front door is rotated about another hinged bearing by the right door connecting rod. The left and right front doors perform a longitudinal movement and a rotation movement by means of the door-moving bracket and the hinged structure.

When it is required to close the thi-directional doors of the cabinet, the top cover of the cabinet is pulled, and the door-moving bracket coupled with the top cover drives the left and right sliders to slide outwardly on the left and right linear guiding rails respectively. The left front end of the door-moving bracket hingedly drives the left front door to move outwardly, and the right front end of the door-moving bracket hingedly drives the right front door to move outwardly. Also, the lower end of the left front door is rotated about the hinged bearing by the left door connecting rod, and the lower end of the right front door is rotated about the hinged bearing by the right door connecting rod. The left and right front doors perform the longitudinal movement and the rotation movement by means of the door-moving bracket and the hinged structure.

The present application has a major advantage in that, by pushing and pulling the top cover, the left and right front doors may be opened and closed by means of the hinged structure associated with the door-moving bracket, the left and right front doors, the bearing fixing holder and the connecting rods. The transmission and direction changing may be achieved by taking full advantage of hinged joint, so as to implement the tri-directional interaction between the top cover and the left and right front doors, resulting in a simple and convenient operation, sufficient utilization of the inner space of the cabinet, and a safe and reliable structure.

| Reference numerals in FIGS. 1, 2 and 3: | |
|---|---|
| 1' cabinet shell, | 2' door, |
| 3' upper supporting arm, | 4' upper clamping plate, |
| 5' lower supporting arm, | 6' lower clamping plate, |
| 7' motor. | |

| Reference numerals in FIGS. 4 to 11: | |
|---|---|
| 1 shell, | 2 front door, |
| 3 top cover, | 4 door-moving bracket, |
| 5 guiding rail fixing holder, | 6 guiding rail, |
| 7 slider, | 8 rotating shaft, |
| 9 doorframe, | 10 door connecting rod, |
| 11 fixing holder, | 12 guiding groove. |

DETAILED DESCRIPTION OF THE INVENTION

The present application will be further described in conjunction with drawings hereinafter.

As shown in FIGS. 4 to 11, a tri-directional-sliding door structure suitable for a double gyroscopic paint mixer of the present application includes a top cover 3, left and right front doors 2 arranged symmetrically, a door-moving bracket 4, and left and right linear guiding rails 6. The top cover 3 is located at the top of a cabinet and is fixedly mounted on the door-moving bracket 4. The left and right front doors 2 are symmetrically arranged on a front side of the cabinet. The left and right linear guiding rails 6 are mounted on a cabinet shell 1 via guiding rail fixing holders 5, respectively. The left and right sides of the door-moving bracket 4 is symmetrically connected to sliders 7 arranged on and sliding along the left and right linear guiding rails 6 respectively. The left and right front doors are symmetrically hinged to two sides of the door-moving bracket 4 via doorframes 9, and the lower ends of the left and right front doors 2 are both interacted with a fixing holder 11 at the bottom of the cabinet through connecting parts.

Figure 10:
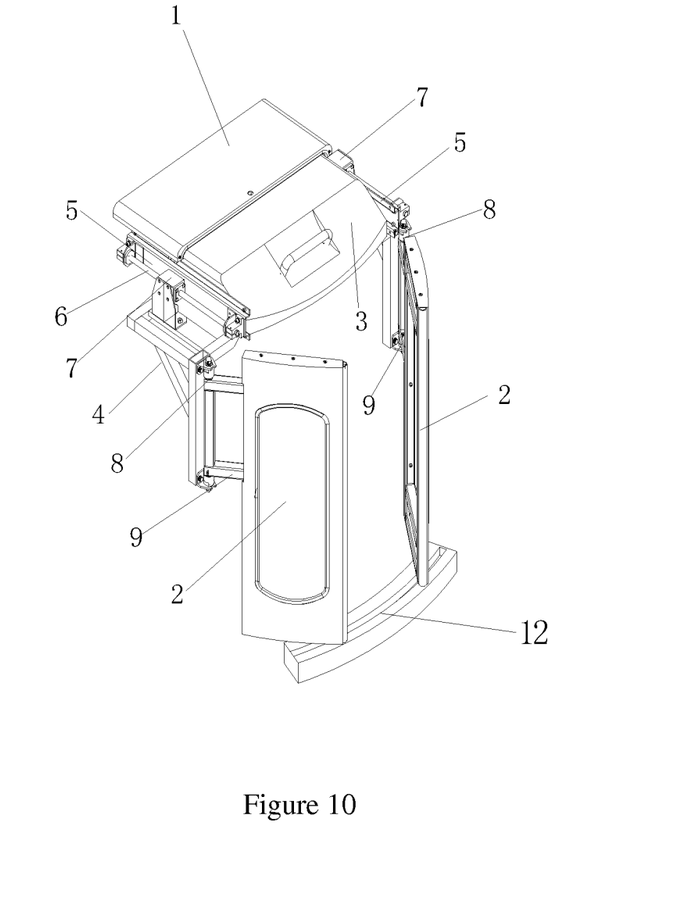
FIG. 10 is an isometric view showing the guiding-groove coupling structure of a left front door and a right front door of the present application (with doors being opened)
Figure 11:
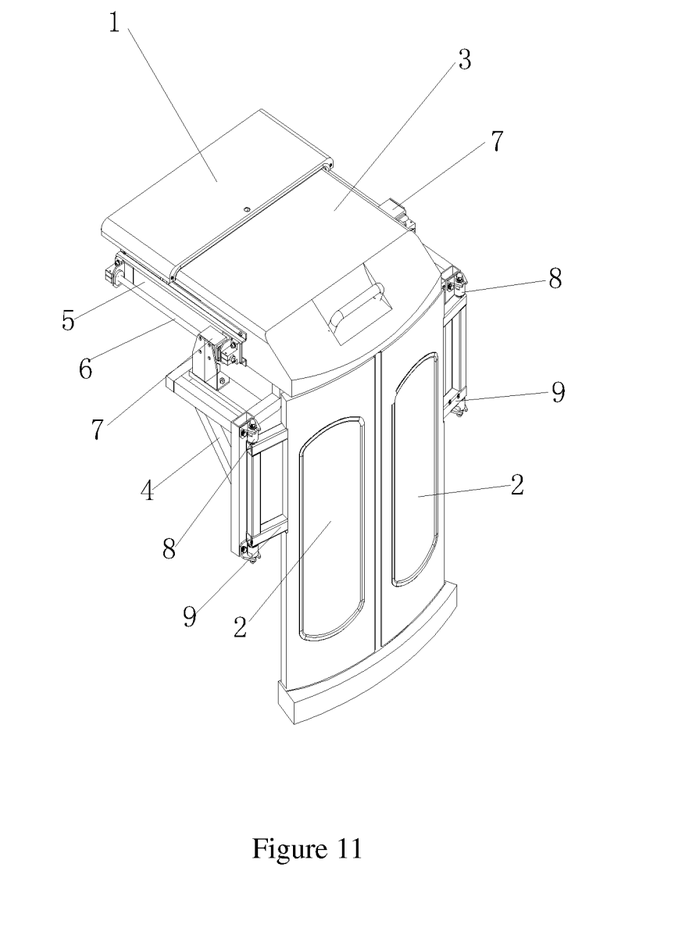
FIG. 11 is an isometric view showing the guiding-groove coupling structure of the left front door and the right front door of the present application (with doors being closed).

The lower ends of the front doors 2 may be connected to the fixing holder 11 at the bottom of the cabinet in two manners as follows: i) the lower ends of the left and right front doors 2 are both hinged to the fixing holder 11 at the bottom of the cabinet via door connecting rods 10 (referring to FIG. 7); ii) the lower ends of the left and right front doors 2 are both interacted with an arc guiding groove 12 arranged in the fixing holder 11 via rotating wheels (referring to FIG. 10).

The operating principle and process of the present application will be described below.

Figure 9:
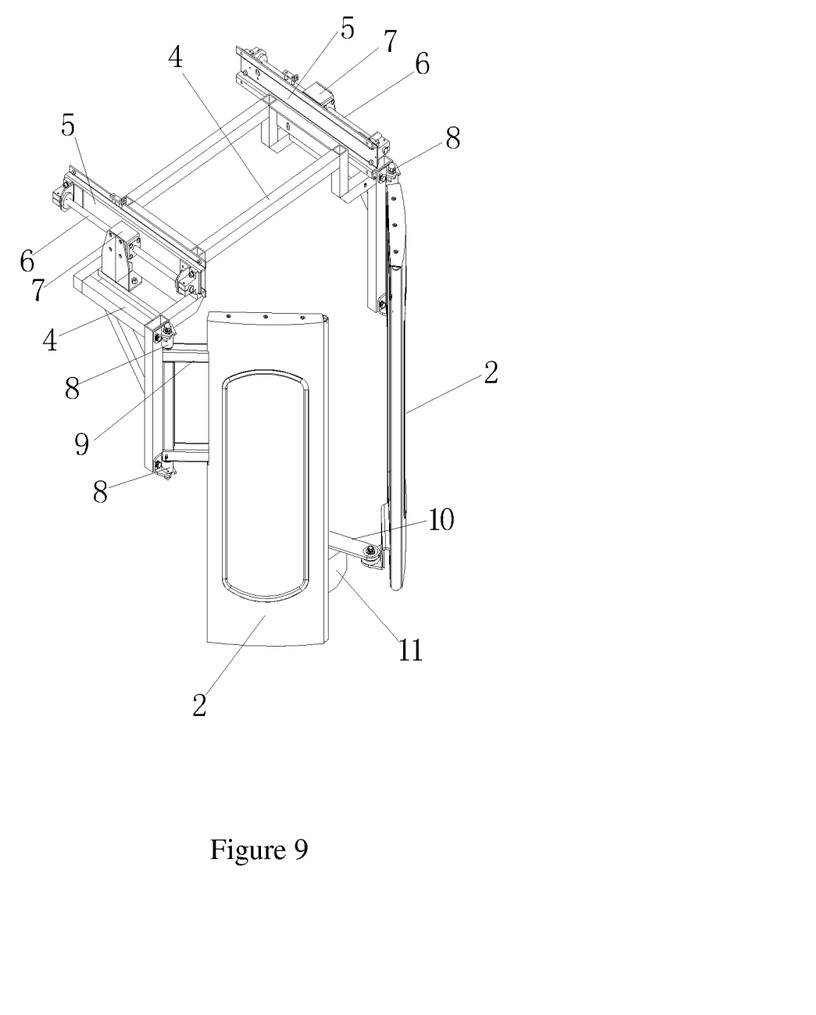
FIG. 9 is an isometric view showing the hinged connection of the tri-directional-sliding door structure of the present application.

The top cover 3 on the cabinet has a left end connected to the left slider 7 and a right end connected to the right slider 7. The left and right linear guiding rails 6 are symmetrically fixed on the cabinet shell 1. The left and right sliders 7 are symmetrically fixed on the door-moving bracket 4. The left end of the left front door 2 is coupled to the left end of the door-moving bracket 4 via a door rotating shaft 8 in hinged way; the right end of the right front door 2 is coupled to the right end of the door-moving bracket 4 via another door rotating shaft 8 in hinged way; and the lower end of the left front door 2 and the lower end of the right front door 2 are coupled symmetrically via connecting rods 10 and the rotating shaft to the fixing holder 11 fixed at the bottom of the cabinet in hinged way, respectively.

Figure 5:
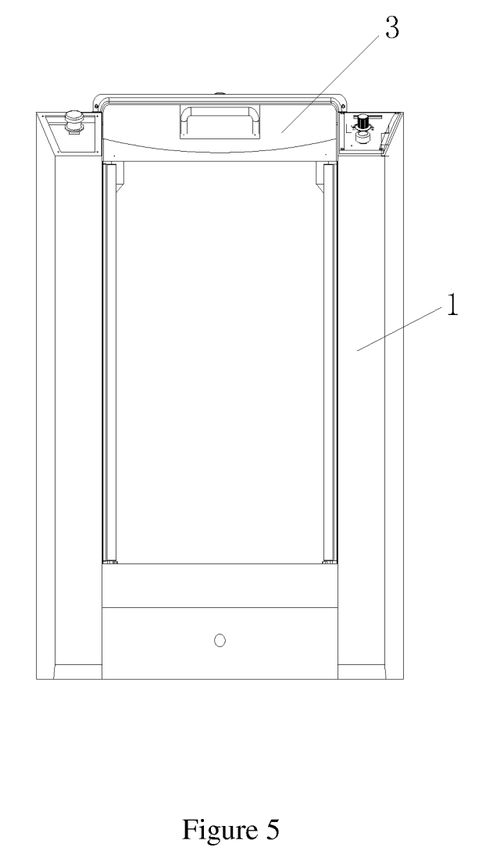
FIG. 5 is a front view of the entire structure of the tri-directional-sliding door double gyroscopic mixer of the present application (with doors being opened)
Figure 7:
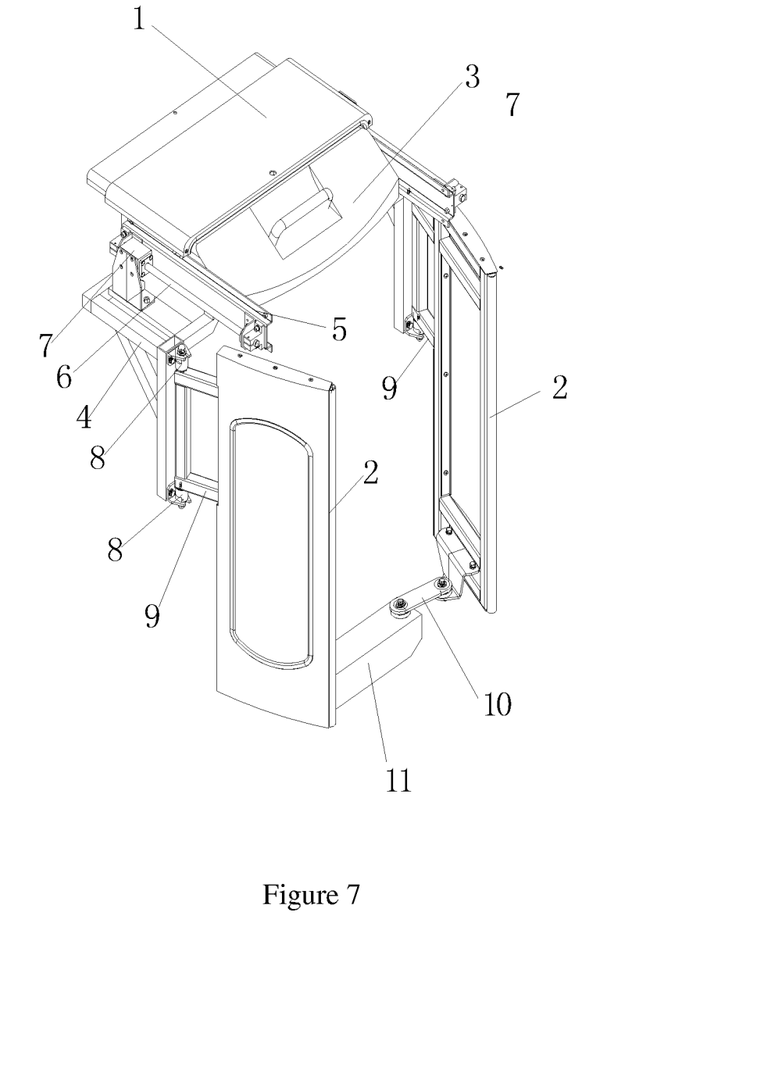
FIG. 7 is an isometric view of the assembly of the tri-directional-sliding door structure of the present application (with doors being opened)
Figure 8:
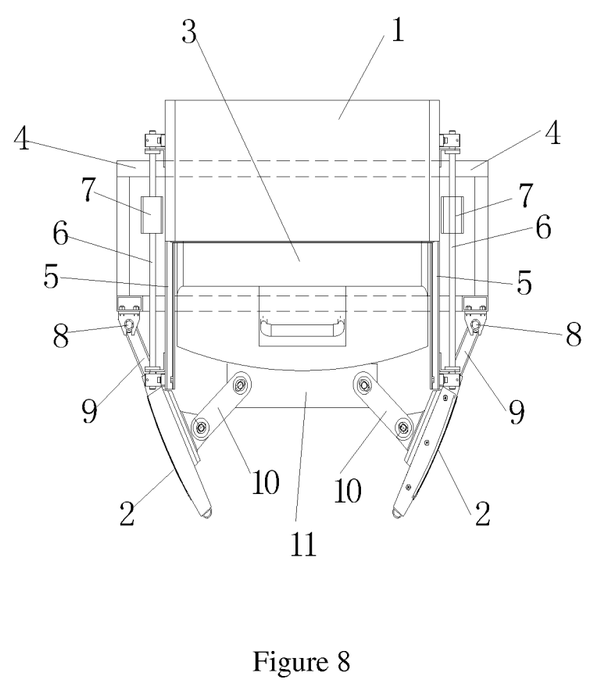
FIG. 8 is a top view of the assembly of the tri-directional-sliding door structure of the present application.

When it is required to open the thi-directional doors of the cabinet, the top cover 3 of the cabinet is pushed, and the door-moving bracket 4 coupled with the top cover 3 drives the left and right sliders 7 to slide inwardly on the left and right linear guiding rails 6 respectively. The left front end of the door-moving bracket 4 hingedly drives the left front door 2 to move inwardly, and the right front end of the door-moving bracket 4 hingedly drives the right front door 2 to move inwardly. Also, the lower end of the left front door 2 is rotated about a hinged bearing by the left door connecting rod 10, and the lower end of the right front door 2 is rotated about another hinged bearing by the right door connecting rod 10. The left and right front doors 2 perform a longitudinal movement and a rotation movement by means of the door-moving bracket 4 and the hinged structure.

Figure 4:
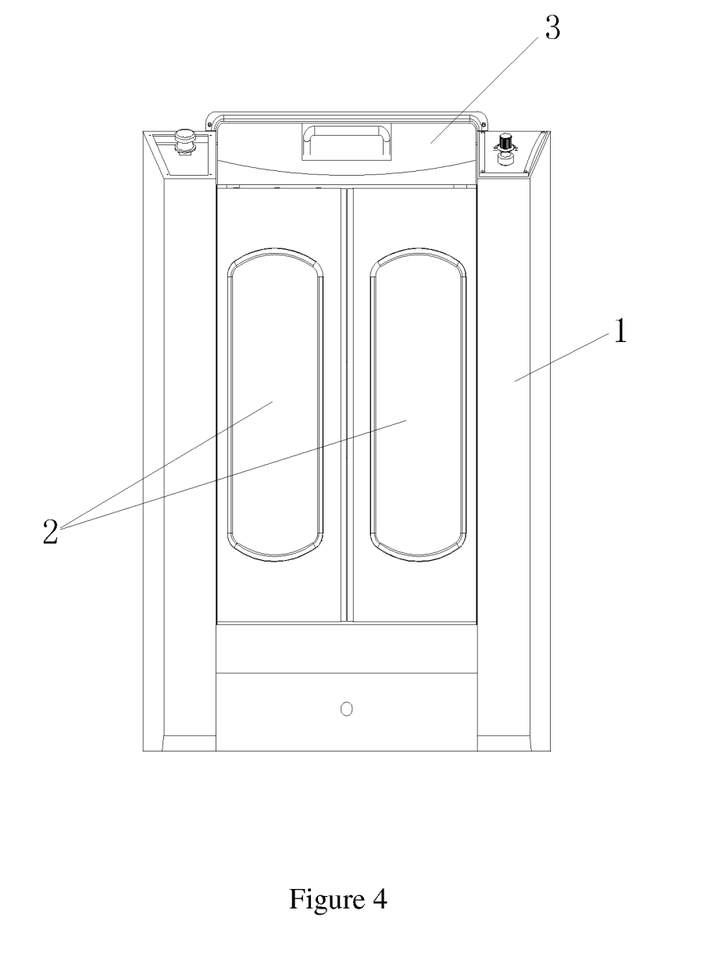
FIG. 4 is a front view of an entire structure of a tri-directional-sliding door double gyroscopic mixer of the present application (with doors being closed)
Figure 6:
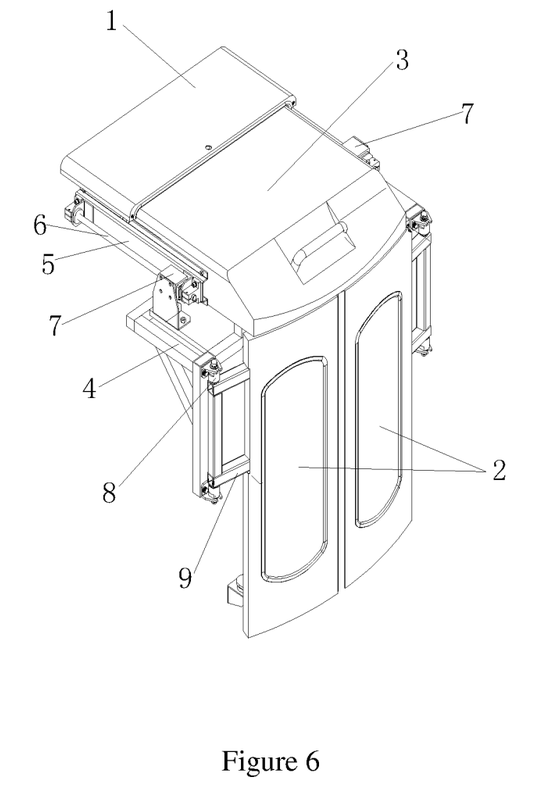
FIG. 6 is an isometric view of an assembly of a tri-directional-sliding door structure of the present application (with doors being closed)

When it is required to close the thi-directional doors of the cabinet, the top cover 3 of the cabinet is pulled, and the door-moving bracket 4 coupled with the top cover 3 drives the left and right sliders 7 to slide outwardly on the left and right linear guiding rails 6 respectively. The left front end of the door-moving bracket 4 hingedly drives the left front door 2 to move outwardly, and the right front end of the door-moving bracket 4 hingedly drives the right front door 2 to move outwardly. Also, the lower end of the left front door 2 is rotated about the hinged bearing by the left door connecting rod 10, and the lower end of the right front door 2 is rotated about the hinged bearing by the right door connecting rod 10. The left and right front doors 2 perform the longitudinal movement and the rotation movement by means of the door-moving bracket 4 and the hinged structure.

The present application has a major advantage in that, by pushing and pulling the top cover 3, the left and right front doors 2 may be opened and closed by means of the hinged structure associated with the door-moving bracket 4, the left and right front doors 2, the bearing fixing holder 11 and the connecting rods 10. The transmission and direction changing may be achieved by taking full advantage of hinged joint, so as to implement the tri-directional interaction between the top cover 3 and the left and right front doors 2, resulting in a simple and convenient operation, sufficient utilization of the inner space of the cabinet, and a safe and reliable structure.

The person skilled in the art should understand that, the present application is described by examples of a tri-directional-sliding door structure suitable for a double gyroscopic paint mixer, but is not limited thereto. For example, the present application is also applicable to vibrating mixers, other types of gyroscopic paint mixers and other types of paint mixers.

The invention claimed is:

1. A tri-directional-sliding door structure suitable for a double gyroscopic paint mixer, comprising:
    a top cover,
    left and right front doors arranged symmetrically,
    a door-moving bracket, and
    left and right linear guiding rails,
    wherein the top cover is located at the top of a cabinet and is fixedly mounted on the door-moving bracket, the left and right front doors are symmetrically arranged on a front side of the cabinet, the left and right linear guiding rails are mounted on a cabinet shell by guiding rail fixing holders respectively, left and right sides of the door-moving bracket are symmetrically connected to sliders arranged on and sliding along the linear guiding rails, the left and right front doors are symmetrically hinged to two sides of the door-moving bracket, and lower ends of the left and right front doors are both interacted with a fixing holder at the bottom of the cabinet via connecting parts.

2. The tri-directional-sliding door structure suitable for the double gyroscopic paint mixer according to claim 1, wherein the lower ends of the left and right front doors are both hinged to the fixing holder at the bottom of the cabinet via connecting rods.

3. The tri-directional-sliding door structure suitable for the double gyroscopic paint mixer according to claim 1, wherein the lower ends of the left and right front doors are interacted with an arc guiding groove arranged in the fixing holder via rotating wheels.

4. A paint mixer, comprising:
a coating barrel,
an upper clamping plate,
a lower clamping plate and
the tri-directional-sliding door structure according to claim 1;
wherein the upper clamping plate and the lower clamping plate are located between an upper supporting arm and a lower supporting arm, and a left end of the left front door and a right end of the right front door are hinged to the door-moving bracket via rotating shafts, respectively.

5. The paint mixer according to claim 4, wherein the lower end of the left front door and the lower end of the right front door are hinged to the fixing holder at the bottom of the cabinet shell via connecting rods, respectively.

6. The paint mixer according to claim 4, wherein the lower end of the left front door and the lower end of the right front door are interacted with a guiding groove arranged in the fixing holder via rotating wheels, respectively.

7. The paint mixer according to claim 4, wherein the paint mixer is a double gyroscopic paint mixer.

8. The paint mixer according to claim 4, wherein the paint mixer is a gyroscopic paint mixer or a vibrating mixer.

* * * * *